United States Patent
Pisklak et al.

(10) Patent No.: US 12,018,207 B2
(45) Date of Patent: Jun. 25, 2024

(54) MITIGATION OF TRANSIENT GELS IN CEMENTS

(71) Applicant: Halliburton Energy Services, Inc., Houston, TX (US)

(72) Inventors: Thomas Jason Pisklak, Houston, TX (US); Samuel J. Lewis, Houston, TX (US); Claudia Pineda, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/892,787

(22) Filed: Aug. 22, 2022

(65) Prior Publication Data

US 2024/0059955 A1   Feb. 22, 2024

(51) Int. Cl.
*E21B 33/13* (2006.01)
*C09K 8/487* (2006.01)

(52) U.S. Cl.
CPC .............. *C09K 8/487* (2013.01); *E21B 33/13* (2013.01)

(58) Field of Classification Search
None
See application file for complete search history.

(56) References Cited

U.S. PATENT DOCUMENTS

| | | | |
|---|---|---|---|
| 11,739,247 B1 | 8/2023 | Boul | |
| 2012/0015852 A1 | 1/2012 | Quintero et al. | |
| 2012/0245058 A1 | 9/2012 | Monteiro et al. | |
| 2013/0341028 A1* | 12/2013 | Christian | C09K 8/92 166/305.1 |
| 2014/0134092 A1* | 5/2014 | Shankman | B82Y 30/00 423/448 |
| 2015/0108391 A1* | 4/2015 | Tour | H01F 1/01 252/62.55 |
| 2015/0152314 A1 | 6/2015 | Muthusamy et al. | |
| 2015/0275067 A1* | 10/2015 | Kabbani | C09K 8/03 507/214 |
| 2017/0327729 A1 | 11/2017 | Salla et al. | |
| 2018/0282214 A1 | 10/2018 | Xiang et al. | |
| 2019/0144280 A1 | 5/2019 | Opoku | |
| 2020/0056086 A1* | 2/2020 | Haq | E21B 43/16 |
| 2020/0308469 A1* | 10/2020 | Taleghani | C04B 28/02 |
| 2021/0061661 A1 | 3/2021 | Opoku | |

(Continued)

FOREIGN PATENT DOCUMENTS

| | | |
|---|---|---|
| CN | 104891479 A | 9/2015 |
| CN | 109133806 A | 1/2019 |

(Continued)

OTHER PUBLICATIONS

Filing Receipt, Specification and Drawings for U.S. Appl. No. 17/892,775, filed Aug. 22, 2022, entitled "Graphene Fluid Utilized to Suspend Particulates," 46 pages.

(Continued)

*Primary Examiner* — Andrew Sue-Ako
(74) *Attorney, Agent, or Firm* — Conley Rose, P.C.; Rodney B. Carroll (57) ABSTRACT

A cement slurry including graphene, a cement, and water; the graphene comprises bioderived renewable graphene (BRG). The cement slurry has reduced transient gel formation relative to a same cement slurry absent the graphene. Methods of mitigating transient gels in cement are also provided.

18 Claims, 2 Drawing Sheets

(56) References Cited

U.S. PATENT DOCUMENTS

| | | |
|---|---|---|
| 2021/0238040 A1 | 8/2021 | Opoku et al. |
| 2022/0234955 A1 | 7/2022 | Masotti |
| 2023/0279283 A1 | 7/2023 | Pang et al. |

FOREIGN PATENT DOCUMENTS

| | | |
|---|---|---|
| CN | 111116081 B | 3/2021 |
| WO | 2015084438 A1 | 6/2015 |
| WO | 2021076667 A1 | 4/2021 |
| WO | 2023168263 A1 | 9/2023 |

OTHER PUBLICATIONS

Filing Receipt, Specification and Drawings for U.S. Appl. No. 17/892,781, filed Aug. 22, 2022, entitled "Use of Graphene as a Cement Retarder," 43 pages.

Filing Receipt, Specification and Drawings for U.S. Appl. No. 17/892,790, filed Aug. 22, 2022, entitled "Use of Graphene to Enhance Stability and Density Control of Cement Slurriess," 41 pages.

First Office Action dated Mar. 23, 2023 (17 pages), U.S. Appl. No. 17/892,781, filed Aug. 22, 2022.

Ikram, Rabia et al., "Utilization of eco-friendly waste generated nanomaterials in water-based drilling fluids; state of the art review", Materials, Jul. 27, 2021 (Publication date), vol. 14, Article No. 4171, Internal pp. 1-28 (38201 ISRWO).

Foreign Communication from Related Application—International Search Report and Written Opinion of the International Searching Authority, International Application No. PCT/US2023/023475, dated Sep. 12, 2023,9 pages, abstract tables; 1, 2.

Foreign Communication from Related Application—International Search Report and Written Opinion of the International Searching Authority, International Application No. PCT/US2023/024519, dated Sep. 25, 2023, 9 pages.

"Zhi Ge et al., "The Effect of the Addition of Graphene Nanoplatelets on the Selected Properties ofCementitious Composites", Frontiers in Built Environment, pp. 1-10 2021, vol. 7, Article No. 673346."

Rhee, I. et al., "Compressive Strength Sensitivity of Cement Mortar Using Rice Husk-Derived Graphene With a High Specific Surface Area", Construction and Building Materials, 2015, vol. 96, pp. 189-197.

"Alkhamis, M. et al., "New Cement Formulations Utilizing Graphene Nano Platelets to Improve CementProperties and Long-Term Reliability in Oil Wells", SPE Kingdom of Saudi Technical Symposium and Exhibition, 2018, SPE-192342-MS, pp. 1-17."

Foreign Communication from Related Application—International Search Report and Written Opinion of the International Searching Authority, International Application No. PCT/US2023/023473, dated Sep. 12, 2023,10 pages.

Foreign Communication from Related Application—International Search Report and Written Opinion of the International Searching Authority, International Application No. PCT/US2023/024521, dated Sep. 19, 2023,9 pages.

Filing Receipt, Specification and Drawings for U.S. Appl. No. 18/367,145, filed Sep. 21, 2023, entitled "Bioderived Renewable Graphene Enhanced Cement," 46 pages.

First Office Action dated Mar. 23, 2023 (17 pages), U.S. Appl. No. 17/892,775, filed Aug. 22, 2022.

\* cited by examiner

MITIGATION OF TRANSIENT GELS IN CEMENTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally cements. More specifically, the present disclosure relates to the mitigation of transient gels in cements. Still more specifically, the present disclosure relates to the mitigation of transient gels in non-oilwell (e.g., construction grade) cements, in embodiments making them useful as oilwell cements.

BACKGROUND

Although potentially more desirable from a procurement and supply standpoint, construction grade cements have not heretofore been readily utilizable in typical oil well cement applications. This has been due, at least in part, to a tendency of non-oilwell cements to form strong gels, which can shorten thickening times, especially at higher temperatures (e.g., 140° F.) and lead to inconsistent slurries that can be difficult to control.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "percent by weight of water", abbreviated "% bwow", indicates the amount of additive material divided by the weight of water multiplied by 100 and the phrase. "percent by weight of the composition" or "percent by weight of cement", abbreviated "% bwoc", indicates the amount of additive material divided by the weight of cementitious material multiplied by 100.

As utilized herein, bioderived renewable graphene (BRG) is a biorenewable resource that can be renewed via biological means and produced by biological organisms.

In view of a number of factors, such as, for example, a lack of supply of oilwell grade cement, a generally lower cost of construction grade cement, and a greater availability of construction grade cement, the utilization of construction grade cements in oilwell cementing, as described in embodiments of this disclosure, can be desirable.

As noted above, although potentially more desirable from a procurement and supply standpoint, construction grade cements heretofore have not been readily utilizable in typical oil well cement designs. This has been due, at least in part, to a tendency of non-oilwell cements to form strong gels, which can shorten thickening times, especially at higher temperatures (e.g., 140° F.) and lead to inconsistent slurries that can be difficult to control. Disclosed herein are systems and methods for mitigation of transient gels in such conventionally non-oilwell cements.

Via this disclosure, graphene can be utilized to mitigate cement gels. In embodiments described herein, small amounts of graphene, e.g., pre-dissolved in a mix water, can be utilized to reduce the gel formation of construction grade cements (e.g., also referred to herein as "non-oilwell" cements) and thus allow effective utilization thereof as oilwell cements.

The system and method of this disclosure provide for the use of graphene for cement gel mitigation. Since graphene is highly temperature resistant, it can be utilized, in embodiments as described herein, for gel mitigation at the high temperatures encountered in oilwell cementing operations. As a secondary, synergistic effect, utilizing graphene, as described herein, can provide mechanical property enhancement of the resulting cements, due to the mechanical property modification properties provided by the graphene.

Use of graphene for gel mitigation of construction grade cements, as described herein, can enable higher usage of these cements for oilwell applications which, among other things, can lead to reduced costs. Furthermore, the use of graphene for gel mitigation of construction grade cements, as described herein, can shorten development time of construction grade cement based oilwell cements, since less effort may be required for finding ways of reducing the impact of such strong gels.

Herein disclosed are cement slurries and methods of making and using same that provide for mitigation of gels, thus allowing, in embodiments, construction grade cements to be utilized in oilwell applications. The cement slurry of this disclosure, and methods of making and using same, will now be described with reference to FIG. 1, which is a schematic of a cement slurry 50 (also referred to herein as a "cement composition" 50), according to embodiments of this disclosure; FIG. 2, which is a schematic flow diagram of a method 100 of making such a cement slurry 50 (and mitigating transient gels), according to embodiments of this disclosure; and FIG. 3, which is a schematic flow diagram of a method 200 of using the cement slurry 50, according to embodiments of this disclosure. Reference to "cement slurry' can indicate an unset cement slurry that has not yet hardened to a hardened cement, such as a recently mixed cement slurry.

Figure 1:
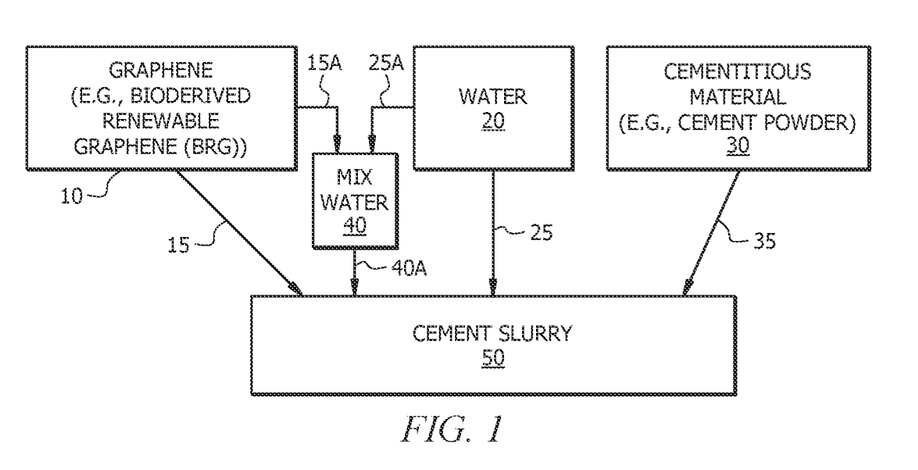
FIG. 1 is a schematic of a cement slurry, according to embodiments of this disclosure.
Figure 2:
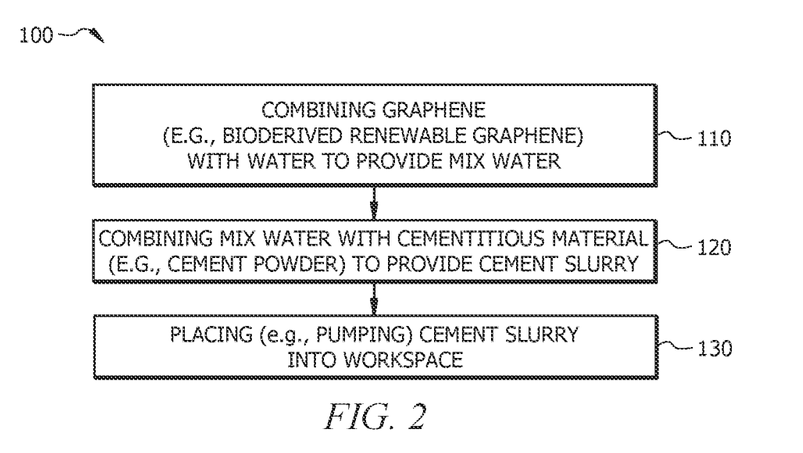
FIG. 2 is a schematic flow diagram of a method, according to embodiments of this disclosure.

With reference to FIG. 1, a cement slurry 50 of this disclosure comprises graphene 10, water 20 (also referred to herein as "aqueous base fluid" 20), and a cementitious material 30 (e.g., a cement powder, also referred to herein simply as a "cement"). The cement slurry 50 has reduced transient gel formation relative to a same cement slurry absent the graphene 10.

According to embodiments of this disclosure, the graphene 10 can comprise bioderived renewable graphene (BRG). The cement slurry 50 can comprise from about 0.01 to about 20, from about 0.1 to about 15, from about 0.5 to about 5, or greater than or equal to about 0, 0.1, 0.5, 1, 2, 3, 4, 5, 6, 7, 8, 9, 10 or 15, and/or and less than or equal to about 20, 19, 18, 17, 16, 15, 10, or 5 percent graphene (e.g., BRG) by weight of cement 20 (% BRG bwoc).

In embodiments, the graphene 10 does not comprise or does not consist of a synthetic graphene. According to embodiments of this disclosure, the graphene 10 can comprise bioderived renewable graphene (BRG). In embodiments, the BRG comprises graphene 10 derived from a plant. In embodiments, the BRG comprises graphene 10 derived from a carbohydrate. For example, in embodiments, the carbohydrate comprises cassava (e.g., cassava root), corn (e.g., corn grain, corn flour), sugar cane (e.g., sucrose), and/or rice (e.g., rice grain), and the graphene 10 comprises graphene derived from cassava, corn, and/or rice. The BRG can comprise graphene with a fused sheet-like morphology (e.g., graphene nanosheets, referred to herein as "nanosheets"). Sheet-like indicates stratified, deposited, or arranged in horizontal layers. For example, such BRG derived from cassava and comprising graphene nanosheets is described in U.S. Patent Publication No. 2021/0061661, U.S. Patent Publication No. 2021/0238040, and U.S. Patent Publication No. 2019/0144280, the disclosure of each of which is hereby incorporated herein in its entirety for purposes not contrary to this disclosure. In embodiments, the graphene 10 comprises BRG such as described in the aforementioned patent applications and/or obtained from SurgePower Materials, Inc., New Braunfels, TX.

In embodiments, graphene 10 comprises a carbon nanosheet with distinct properties that can be produced from a renewable carbonaceous raw materials such as, without limitation, cassava root extract, corn flour, rice grain, wheat flour, yam root extract, potatoes root extract, sugar beet roots extract and sucrose (generally referred to herein as carbohydrates). The process for making carbon nanosheet from these carbohydrates can be as follows.

First, the aforementioned carbohydrate can be placed in a solvent, such as a solvent containing water or ethylene glycol or ethanol, to aid hydrolysis. This can be followed by gradual removing of glycosidic linkages in the carbohydrate via chemical and/or thermal activation. This pre-treatment step causes formation of intermediate fused carbon material, which contains limited amount of glycosidic bonds, hydroxyl and carbonyl groups. Chemicals that can be effective include, without limitation, sodium hydroxide, hydrochloric acid, phosphoric acid, phosphorous acid, and nitric acid. In addition, catalyst such as yeast, aluminum-nickel alloy, cobalt, $B_2H_6$, zinc, and copper can be employed.

The mixture of carbonaceous material and chemical and/or catalyst can be exposed to approximately 45 to 1050° C. in air or inert atmosphere to aid formation of a fused carbon network with a sheet-like morphology, referred to herein as an intermediate carbon material.

Another step can include thermochemical activation of the intermediate carbon based material to initiate chemical bonding of carbon atoms to form a hexagonal planar network of mainly sp2 hybridization carbons. This occurs by at least switching oxygen atom and releasing hydroxyl portion of said intermediate carbon material to result in a short range or long range of aromatic ring structure or a mixture of both within the sheet that is retained and other groups or molecules are released. This step can be performed at temperature in the range of 500 to 1500° C., in an inert gas containing hydrogen gas, in embodiments, and can result in a network of high surface area and pore volume sp2 bonded carbon nanosheet.

The resulting carbon nanosheet powders can be washed with up to 10 volume percent hydrochloric acid (HCl) to remove any remaining precursors and catalyst in the final product, and can be followed by heat treatment at 700 to 1500° C. for example in inert atmosphere.

Alternatively or additionally, the step of treating the intermediate carbon product to form mainly sp2 hybridization carbons can be accomplished via chemical process. Such process can include, without limitation, treating the intermediate carbon product with a chemical, such as a chemical chosen from the group of hydrazine, $LiAlH_4$, $B_2H_6$, and/or $NaBH_4$; in embodiments, hydrazine, and in other embodiments $NaBH_4$.

As mentioned above, the process of producing carbon nanosheets can begin with a renewable carbonaceous raw material, such as cassava root extract, corn flour, rice grain, wheat flour, or sucrose. These renewable carbonaceous materials contain a high content of carbohydrates on a water free basis, typically more than 70% by weight. The renewable carbonaceous material can contain various percentages of glucose, and fructose bonded together by glycosidic linkages to form polymeric units such as amylase and amylopectin. Although the molecular formula for glucose and fructose are the same, thus ($C_6H_{23}O_6$), they have different molecular structures.

In order to obtain a carbon nanosheet, each carbohydrate unit can be pre-treated with a dehydration solution, for example containing at least 1% of acid or catalyst. The pretreatment can result in an intermediate carbon material with dark-grey color made up of fused sheet-like morphology.

The mechanism can unfold in two stages. First, the treatment of the carbohydrate via chemical and/or thermal activation can result in hydrolysis and removal of the glycosidic linkages in the polymeric carbohydrate unit to form individual glucose and fructose units. This can be followed by a second mechanism to remove water molecules from each of glucose or fructose units by a dehydration solution. The pretreatment can be accomplished by gradual heating of the carbohydrate and hydration solution, for example at 45 to 1050° C., preferably 80° C., e.g., for up to 36 hours or more. In the process, the carbon atoms can rearrange to form a ring with neighboring carbon atoms. The hydration solution can cause intercalation of the layers of carbon after ring formation, thus giving rise to a layered structure.

The intermediate carbon product can undergo a second treatment to exfoliate the intercalated carbon layers. Several thermal and/or chemical methods can be used to exfoliate the carbon sheet. Thermal methods include direct heating of the intermediate carbon material. Radiant heating in a resistive furnace, or on top of a hotplate, laser irradiation and microwave irradiation can be effective for exfoliating carbon nanosheet and removal of water molecules to form mainly sp2 bonded carbon nanosheets.

Thermal exfoliation via microwave heating can remove substantial amount of $H_2O$ molecules from the intermediate carbon materials, with a reduction in oxygen content from the intermediate carbon materials, for example from 39.5 to 14.6 weight percent.

Exfoliated carbon nanosheets can be washed (e.g., with a 10 volume percent HCl) to remove remaining hydration solution and/or catalyst compounds. Subsequently, the resulting product can be washed with de-ionized water one or several times, for example until the pH is about 7. The resulting material can be thermally treated at high temperature in inert atmosphere to remove any groups attached to the nanosheet and terminate the ends with hydrogen. The carbon nanosheets can have a sheet-like morphology, and carbon composition can be up to 90, 91, 92, 93, or 94 weight percent or more.

In an alternate method of producing carbon nanosheets, the carbohydrate can be soaked in dehydration solution, as previously discussed. The mixture can be directly exposed to rapid and uniform high temperature heating immediately after thorough and uniform mixing. This can cause removal of glycosidic bonds and release of water molecules, thereby forcing the resulting intermediate carbon materials to exfoliate into carbon nanosheet. Specifically, heating can be accomplished by microwave irradiation and/or heating in an oven preheated, for example, to at least 500° C., to yield the carbon nanosheet.

In other embodiments, after thorough and uniform mixing of said carbohydrate and dehydration solution (e.g., containing excess deionized water), this mixture can be slowly heated to temperature below 100° C., and held there a time of, for example, less than 24 hours. The mixture can form a dark colored intermediate solution containing carbon. The dark intermediate solution can be coated on a substrate to form thin films. The resulting films can be exposed to high temperatures in inert atmosphere containing, for example, at least 2% by volume hydrogen gas. The films can be slowly heated, for example in the range of 700-1500° C. to form a thin layer of conducting carbon nanosheet on a substrate. The substrate can include, for example, copper foil, silicon wafer, glass slide or a quartz substrate.

In embodiments, a process for forming the nanosheets can comprise providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, e.g., where the dehydration solution has a hydrogen ions concentration of at least approximately 1%; charging said reactor with air or inert gas; heating the reaction mixture to remove glycosidic linkages and water molecules from the carbohydrate, thereby producing an intermediate mixture with sheet-like morphology; and further heating the intermediate mixture in inert gas to form the carbon nanosheet material. The carbon nanosheet material can be in the form of a powder. The carbohydrate source can comprise yam root extract, potato root extract, cassava root extract, cassava root flour, tapioca flour, dried cassava root pulp, dried and fried cassava root flakes, sugarcane extract, sugar beet root extract, sucrose, rice grain, corn, or wheat grain.

In embodiments, the solvent can be chosen from distilled water, deionized water, ethanol, and ethylene glycol. In embodiments, the dehydration solution can be chosen from sodium hydroxide, hydrochloric acid, phosphoric acid, phosphorous acid, and nitric acid. In embodiments, the process further comprises removing the dehydration solution by washing and diluting with excess distilled or deionized water prior to further heating of the intermediate mixture.

The catalyst can be chosen from platinum, palladium, $LiAlH_4$, nickel, yeast, aluminum-nickel alloy, cobalt, $B_2H_6$, zinc, $NaBH_4$, copper, or combinations thereof. The process can further include removing the catalyst by washing, filtering, magnetic separation, sonication, sieving, and/or centrifugation prior to further heating of the intermediate mixture.

The heating of the reaction mixture can be carried out in air or inert gas, for example at approximately 45 to 1050° C. The process can further include, prior to further heating the intermediate mixture, drying the intermediate mixture to produce an intermediate mixture in form of a powder; wherein the intermediate mixture in form of powder is heated in the inert gas, for example at approximately 500 to 15000° C. to produce the carbon nanosheet material. The inert gas can comprise, for example, argon, helium, or nitrogen, and can optionally further comprise a partial pressure of hydrogen gas. The intermediate mixture can be heated to a temperature of approximately 45 to 1050° C.

The carbon nanosheet material can have a specific surface area of at least 2000, 2100, 2200, 2300, 2400, or 2496 $m^2/g$ and/or a pore volume of at least 3.0, 3.1, 3.2, 3.3, 3.4, 3.5, or 3.6 cc/g. The carbon nanosheet material can have a pore volume of up to 3.0, 4.0, or 5.0 cc/g.

Cementitious material 30 (also referred to herein simply as "cement" 30) can comprise a cement powder, such as, without limitation, a Portland cement. A variety of cementitious materials 30 can be used in the cement slurry 50, including cementitious materials comprised of calcium, aluminum, silicon, oxygen, and/or sulfur which set and harden by reaction with water. Such hydraulic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In embodiments, cementitious material 30 comprises a Type I, IA, II, IIA, III, IIIA, IV, V, VI, or VII Portland cement, or a combination or subtype thereof, such as, for example, a Type IL (e.g., limestone) cement powder, as defined in the ASTM standard (e.g., ASTM C150). In embodiments, cementitious material 30 comprises a non-API cement. In embodiments, cementitious material 30 comprises an API cement, such as, for example, an API Portland cement from Class A, B, C, D, E, F, G, H, K, and/or L, such as from one of more of Classes A, C, H, and G.

As noted above, in embodiments, cement 50 can comprise a construction grade cementitious material 30. According to this disclosure, a construction grade cement is a non-API cement, such as a cementitious material 30 comprising greater than about 1% by weight of calcium aluminate, C3A. In embodiments, the cementitious material 30 has an aluminate content (e.g., C3A) in a range of from about 1 to about 30, from about 3 to about 20, from about 5 to about 15, or greater than or equal to about 1, 3, or 5 percent aluminate by mass of cementitious material 30.

The cement slurry 50 of this disclosure can contain one or more additives. In embodiments, the additives comprise one or more selected from resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, cement kiln dust, gas migration control additives, formation conditioning agents, or combinations thereof.

Water 20 can comprise an aqueous base fluid. An aqueous base fluid 20 can be present in the cement slurry 50 in an amount sufficient to make a slurry which is pumpable for introduction to a desired location in a workspace, for example, down hole, in embodiments. In embodiments, the aqueous base fluid or water 30 comprises fresh water; brackish water; saltwater; or a combination thereof. The water 20 can be fresh water, brackish water, saltwater, or any combination thereof. In embodiments, the water 20 can be present in the cement slurry 50 in an amount of from about 20% to about 80% by weight of cement ("bwoc"), from about 28% to about 60% bwoc, or from about 36% to about 66% bwoc.

In embodiments, the cement slurry 50 can have a slurry density which is pumpable for introduction down hole. In embodiments, the density of the cement slurry 50 is from about 7 pounds per gallon (ppg) to about 20 ppg, from about 10 ppg to about 18 ppg, or from about 13 ppg to about 17 ppg.

A yield point of the cement slurry 50 as measured according to API 10B-2 (e.g., after two hours of quiescent aging at room temperature and pressure) can be reduced by at least 10, 20, 30, 40, or 50% relative to a same cement slurry absent the graphene 10. An apparent viscosity at 100 RPM ($AVIS_{100}$) of the cement slurry 50 as measured, for example, according to API 10B-2 (e.g., after two hours of quiescent aging at room temperature and pressure) can be reduced by at least 10, 20, 30, 40, or 50% relative to the same cement slurry absent the graphene 10. A thixotropic rate of the cement slurry 50, measured as the ten minute yield point (e.g., measured according to API 10B-2) divided by ten can be less than a thixotropic rate of a same cement slurry absent the graphene 10. In embodiments, the thixotropic rate of the cement slurry 50 can be reduced by at least 5, 10, 15, or 20% relative to the thixotropic rate of the same cement slurry absent the graphene 10.

Also provided herein is a method of mitigating transient gels in a cement slurry. The method will now be described with reference to FIG. 2, which is schematic flow diagram of a method 100, according to embodiments of this disclosure. Method 100 of making the cement slurry 50, whereby transient gels are mitigated, comprises, combining the graphene 10 and cementitious material 30 with water 20 to provide the cement slurry 50. In embodiments, as depicted at 110, graphene 10 is combined with water 20 to provide a mix water 40, and, at 120, the mix water 40 is combined with the cementitious material (e.g., cement powder) 30 to provide the cement slurry 50. Alternatively or additionally, graphene 10 can be otherwise incorporated into cement slurry 50. For example, in embodiments, graphene 10 can be dry blended into cement slurry 50. As depicted in FIG. 2, Method 100 can further include, at 130, placing (e.g., pumping) the cement slurry 50 into a workspace.

As depicted in FIG. 1, line 15, 25, and 35 can be utilized to combine graphene 10, water 20, and cementitious material 30, respectively. Alternatively or additionally, lines 15A and 25A can be utilized to combine graphene 10 with water 20 to provide mix water 40, and lines 40A and 35 can be utilized to combine the mix water 40 and cementitious material 30 to provide the cement slurry 50. The order of combination of the graphene 10, water 20, and cementitious material 30 can be adjusted, and remain within the scope of this disclosure.

As described hereinabove, the graphene 10 can comprise bioderived renewable graphene (BRG), such as, without limitation, BRG comprising graphene derived from a plant, such as the cassava plant. The BRG can comprise graphene with a fused sheet-like morphology (e.g., graphene nanosheets, such as the graphene 10 described in U.S. Patent Publication No. 2021/0061661, U.S. Patent Publication No. 2021/0238040, and/or U.S. Patent Publication No. 2019/0144280, incorporated hereinabove by reference. Without being limited by theory, BRG can provide enhanced results relative to non-bioderived graphene due to characteristics of the BRG provided by the production thereof.

As discussed hereinabove, the cement slurry 50 can comprise from about 0.01 to about 20, from about 0.1 to about 15, from about 0.5 to about 5, or greater than or equal to about 0, 0.1, or 0.5 and less than or equal to about 20, 15, or 5 percent graphene (e.g., BRG) by weight of cementitious material 30 (% BRG bwoc).

The cementitious material 30 can comprise a Portland cement, such as, for example, a Type I, IA, II, IIA, III, IIIA, IV, V, VI, or VII Portland cement, a subtype thereof, or a combination thereof. In embodiments, the cementitious material 30 comprises a construction grade (e.g., non-API) cement, as described hereinabove. The construction grade cement can be a cement comprising greater than about 1 weight percent (wt %) calcium aluminate (C3A).

Also disclosed herein is a method of using the cement slurry 50 of this disclosure, for example, to mitigate transient gels and enable the use of a non-API grade cement as an oilwell cement. Such a method will now be described with reference to FIG. 3, which is a schematic flow diagram of a method 200, according to embodiments of this disclosure. Method 200 comprises: providing a cement slurry 50 of this disclosure at 210, placing the cement slurry 50 in a workspace at 220, and allowing the cement slurry 50 to set to provide a hardened cement (also referred to herein as a "set" cement) at 230. The cement slurry can be a cement slurry 50 as described hereinabove with reference to FIG. 1 and/or made as described hereinabove with reference to FIG. 2, wherein the cement slurry 50 comprises graphene 10 (e.g., BRG), a cementitious material (e.g., cement powder) 30, and water 20. The cement slurry 50 can have reduced transient gel formation relative to a same cement slurry absent the graphene 10.

Figure 3:
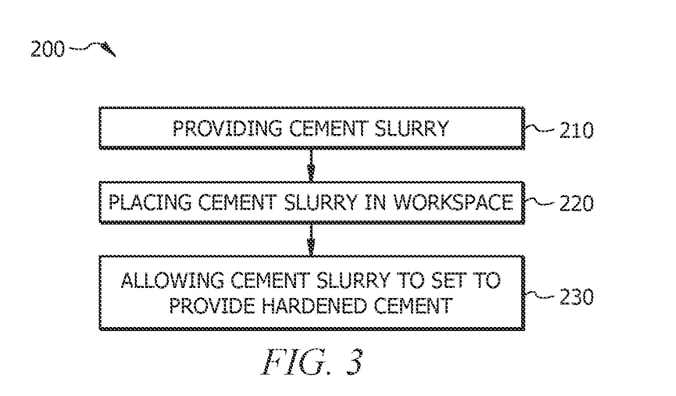
FIG. 3 is a schematic flow diagram of a method, according to embodiments of this disclosure.

The workspace can comprise an oilwell workspace, such as, for example and without limitation, a subterranean workspace, such as a wellbore. In embodiments, the workspace comprises a non-oilwell workspace, such as, for example and without limitation, a construction site, roadway repair, tunnel/mining, bridges, etc.

As detailed hereinabove, the graphene 10 can comprise bioderived renewable graphene (BRG), such as graphene 10 derived from a plant, such as, without limitation, the cassava plant. The BRG can comprise graphene nanosheets, in embodiments.

As noted hereinabove, the cement slurry 50 can comprise from about 0.01 to about 20, from about 0.1 to about 15, from about 0.5 to about 5, or greater than or equal to about 0, 0.1, or 0.5 and less than or equal to about 20, 15, or 5 percent BRG by weight of cementitious material 30 (% BRG bwoc).

As noted above, in embodiments, the cementitious material 30 comprises a Portland cement, such as a Type I, IA, II, IIA, III, IIIA, IV, V, VI, or VII Portland cement, a subtype thereof, or a combination thereof. In embodiments, the cementitious material 30 comprises a construction grade (e.g., non-API) cement, wherein, as described hereinabove, a construction grade cement is a cement comprising greater than about 1 wt % calcium aluminate (C3A).

By way of non-limiting example, the exemplary cement slurries 50 disclosed herein may be employed in an oilwell workspace. For example, a cement slurry 50 can be deployed at the workspace via any methods known in the art and with the help of this disclosure. For example, cement slurry 50 can be introduced downhole via a cementing apparatus.

Figure 4:
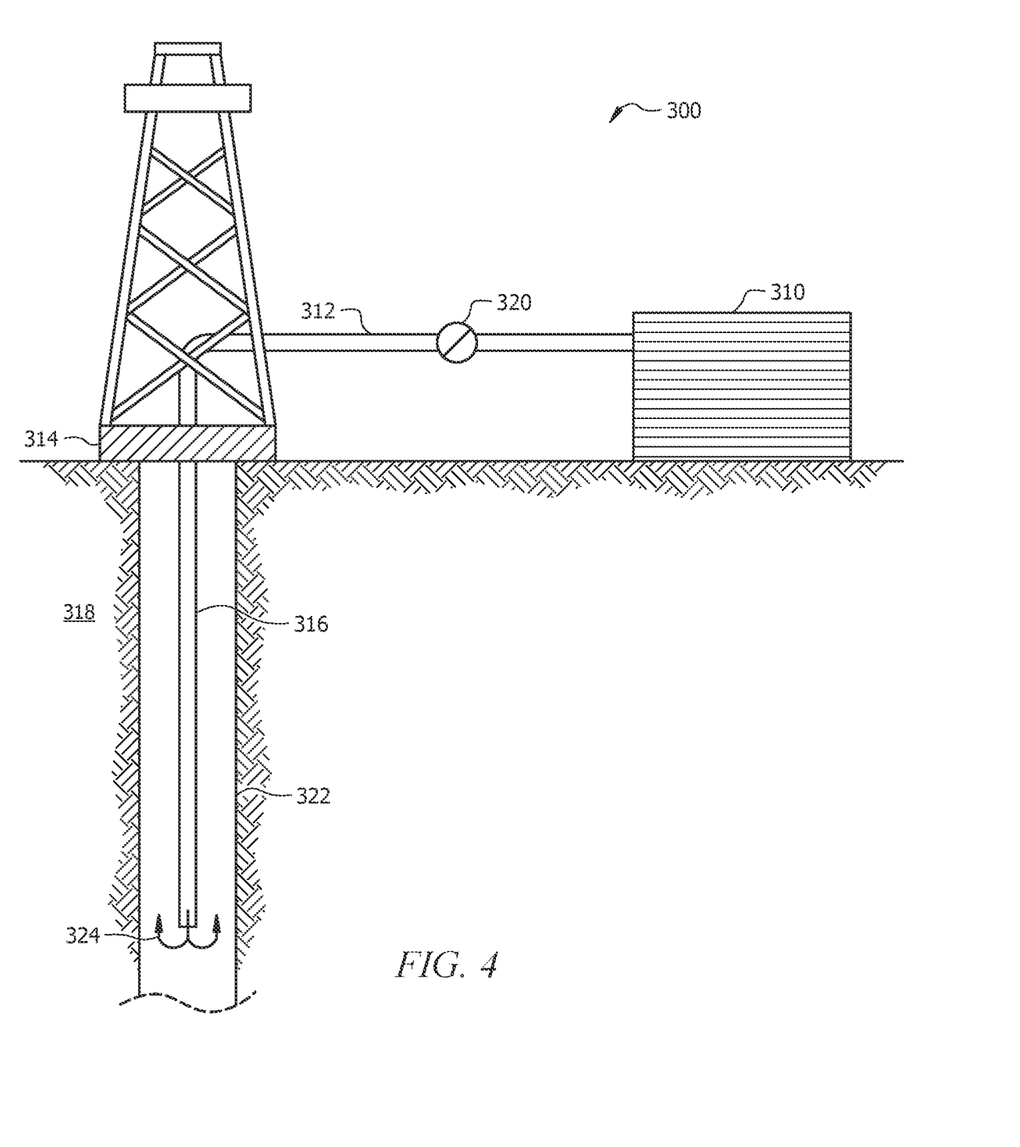
FIG. 4 is a schematic of a cementing workspace, according to embodiments of this disclosure.

FIG. 4 shows an illustrative schematic of cementing workspace or system 300 that can deliver cement slurry 50 of the present disclosure to a downhole location, according to one or more embodiments. It should be noted that while FIG. 4 generally depicts a land-based system, it is to be recognized that like systems may be operated in subsea locations as well. As depicted in FIG. 4, system 300 may include mixing tank 310, in which a cement slurry 50 of the present disclosure may be formulated. Again, in some embodiments, the mixing tank 310 may represent or otherwise be replaced with a transport vehicle or shipping container configured to deliver or otherwise convey the final cement slurry to the well site. The cement slurry 50 may be conveyed via line 312 to wellhead 314, where the cement slurry 50 enters tubular 316 (e.g., a casing, drill pipe, production tubing, coiled tubing, etc.), tubular 316 extending from wellhead 314 into wellbore 322 penetrating subterranean formation 318. Upon being ejected from tubular 316, the cement slurry 50 may subsequently return up the wellbore in the annulus between the tubular 316 and the wellbore 322 as indicated by flow lines 324. In other embodiments, the cement slurry 50 may be reverse pumped down through the annulus and up tubular 316 back to the surface, without departing from the scope of the disclosure. Pump 320 may be configured to raise the pressure of the cement slurry to a desired degree before its introduction into tubular 316 (or annulus). It is to be recognized that system 300 is merely exemplary in nature and various additional components may be present that have not necessarily been depicted in FIG. 4 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Moreover, reverse cementing, where the final cement slurry is directly placed in the annulus between the tubular 316 and the wellbore 322 may also be performed in accordance with the embodiments described herein, without departing from the present disclosure.

One skilled in the art, with the benefit of this disclosure, should recognize the changes to the system described in FIG. 4 to provide for other cementing operations squeeze operations, reverse cementing (where the cement is introduced into an annulus between a tubular and the wellbore and returns to the wellhead through the tubular), and the like.

It is also to be recognized that the disclosed cement slurries 50 may also directly or indirectly affect the various downhole equipment and tools that may come into contact with the final cement slurry during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 4.

Upon setting, the hardened cement produced from cement slurry 50 can have a compressive strength, a tensile strength, a Young's modulus, a Poisson's ratio, or a combination thereof that is at least as high as a compressive strength, a tensile strength, a Young's modulus, a Poisson's ratio, or a combination thereof of a hardened cement produced from a same cement slurry absent the graphene (e.g., absent the BRG).

In embodiments, graphene (e.g., BRG) can be utilized as a suspension aid in a cement slurry 50 of this disclosure, for example, as described in U.S. patent application Ser. No. 17/892,775, filed Aug. 22, 2022, "Graphene Fluid Utilized to Suspend Particulates", the disclosure of which is hereby incorporated herein in its entirety for purposes not contrary to this disclosure; graphene (e.g., BRG) can be utilized as a cement retarder in a cement slurry 50 of this disclosure, for example, as described in U.S. patent application Ser. No. 17/892,781, filed Aug. 22, 2022, entitled, "Graphene as a Cement Retarder", the disclosure of which is hereby incorporated herein in its entirety for purposes not contrary to this disclosure; and/or graphene (e.g., BRG) can be utilized to enhance stability and density control in a cement slurry 50 of this disclosure, for example, as described in U.S. patent application Ser. No. 17/892,790, filed Aug. 22, 2022, entitled, "Use of Graphene To Enhance Stability and Density Control of Cement Slurries", the disclosure of which is hereby incorporated herein in its entirety for purposes not contrary to this disclosure.

The use of graphene, as described herein, to reduce gels of construction grade cements can facilitate usage of such construction grade cements in oilwell applications. Gel formation of construction grade cements can be mitigated via the use of graphene 10, as described herein, and thus enable effective utilization of construction grade cementitious materials 30 in oilwell cements.

The system and method of this disclosure provide for the use of graphene 10 for gel mitigation in cement slurries 5, as described herein. Since graphene 10 is highly temperature resistant, it can be utilized, in embodiments as described herein, for gel mitigation at the high temperatures encountered in oilwell cementing operations. As a secondary, synergistic effect, utilizing graphene 10, as described herein, can provide mechanical property enhancement of the hardened cements resulting from hardening of the cement slurries 50 of this disclosure, due to the mechanical property modification properties provided by the graphene 10.

Other advantages will be apparent to those of skill in the art and with the help of this disclosure.

EXAMPLES

The embodiments having been generally described, the following examples are given as particular examples to demonstrate the practice and advantages of this disclosure. It is understood that the examples are given by way of illustration and are not intended to limit the specification or the claims in any manner.

Example 1: Class H Cement

Inclusion of bioderived graphene 10 into cement slurries 50, as described herein, results in rheological modification of the slurry. Class H cement formulations were prepared as illustrated in Table 1.

TABLE 1

Formulations of Cement Slurries with and without Graphene

| Cement Type | Graphene (% bwoc) | Cement (% bwoc) | Water (% bwoc) | Suspending Aid (% bwoc) |
|---|---|---|---|---|
| Class H | 0.0 | 100.0 | 46.5 | 0.07 |
| Class H | 0.7 | 100.0 | 46.5 | — |

As can be seen in Table 2 below, the Yield Point (YP) and Apparent Viscosity at 100 rpm ($AVIS_{100}$) are both reduced dramatically with the inclusion of graphene 10. This is interesting, as bioderived graphene 10 has a tendency to add structure to fluids. To perform this experiment, two cement slurries were mixed according to API specifications and then aged at room temperature and pressure for 2.0 hours. Rheologies were taken for all cement slurries immediately after mixing and again after aging.

TABLE 2

Rheological properties of Class H Slurries with and without Graphene.

| Cement Type | Graphene (% bwoc) | Time Rheology was Taken | Yield Point ($lb_f/100\,ft^2$) | % Decrease | $AVIS_{100}$ | % Decrease |
|---|---|---|---|---|---|---|
| Class H* (Comparative) | 0.0 | Just Mixed | 24.4 | 51.6 | 110 | 37.3 |
| Class H | 0.7 | Just Mixed | 11.8 | — | 69 | — |
| Class H | 0.0 | After 2 hours | 38.3 | 61.9 | 220 | 55.0 |
| Class H | 0.7 | After 2 hours | 14.7 | — | 99 | — |

The rheology measurements immediately after mixing showed a 37.3% decrease in yield point after adding graphene 10 as well as a 55.0% decrease in apparent viscosity. After 2 hours of static time (basically a free fluid test), the values were taken again and show similar trends with significant reduction in both yield point and viscosity.

Furthermore, the addition of graphene 10 reduced the development of transient gel in the cement slurry 50. Table 3 below shows the data obtained from each slurry.

TABLE 3

Gel properties of Class H Slurries with and without Graphene

| Cement Type | Graphene (% bwoc) | Time Rheology was Taken | 10 Second Gel | % Decrease | 10 Minute Gel | % Decrease |
|---|---|---|---|---|---|---|
| Class H (Comparative) | 0.0 | Just Mixed | 19.3 | 60.6 | 28.0 | 35.0 |
| Class H | 0.7 | Just Mixed | 7.6 | — | 18.2 | — |
| Class H (Comparative) | 0.0 | After 2 hours | 17.8 | 42.1 | 11.5 | 19.1 |
| Class H | 0.7 | After 2 hours | 10.3 | — | 9.3 | — |

Additionally, the thixotropic rate, which is a measure of gel strength development over time, was calculated for each of the slurries. The slurry without graphene 10 had a rate of 2.8 ($lbf/100\,ft^2$)/min immediately after mixing and 1.2 after 2 hours, while the cement slurry 50 with graphene 10 showed decrease in rate of 35% directly after mixing and 19.1% after two hours (1.8 and 0.9, respectively).

Example 2: Type I/II Cement

Inclusion of bioderived graphene 10 into cement slurries results in rheological modification of the slurry. Type I/II cement formulations were prepared as illustrated in Table 4.

TABLE 4

Formulations of Type I/II Slurries with and without Graphene

| Cement Type | Graphene (% bwoc) | Cement (% bwoc) | Water (% bwoc) | Suspending Aid (% bwoc) |
|---|---|---|---|---|
| Type I/II (Comparative) | 0.0 | 100.0 | 45.9 | 0.0 |
| Type I/II | 0.7 | 100.0 | 45.9 | 0.0 |

As can be seen in Table 5 below, the Yield Point (YP) and Apparent Viscosity at 100 rpm ($AVIS_{100}$) are both reduced greatly with the inclusion of graphene 10 after two hours of aging. However, these results are reversed with the rheologies taken immediately after mixing, which may indicate graphene 10 content optimization can be utilized to produce optimal results. To perform this experiment, two cement slurries were mixed according to API specifications and then aged at room temperature and pressure for 2.0 hours. Rheologies were taken for all slurries immediately after mixing and again after aging.

TABLE 5

Rheological properties of Type I/II Slurries with and without Graphene

| Cement Type | Graphene (% bwoc) | Time Rheology was Taken | Yield Point (lbf/100 ft$^2$) | % Change | AVIS$_{100}$ | % Change |
|---|---|---|---|---|---|---|
| Type I/II* (Comparative) | 0.0 | Just Mixed | 15.5 | 48.3 (increase) | 110 | 43.8 (increase) |
| Type I/II | 0.7 | Just Mixed | 30.0 | — | 196 | — |
| Type I/II (Comparative) | 0.0 | After 2 hours | 72.2 | 49.3 (decrease) | 412 | 19.7 (decrease) |
| Type I/II | 0.7 | After 2 hours | 36.6 | — | 331 | — |

Even though there was an increase in both YP and AVIS100 directly after mixing, as the slurries aged the graphene 10 prevented great increases in these values. The rheology measurements taken after two hours of aging showed a 49.3% decrease in yield point after adding graphene as well as a 19.7% decrease in apparent viscosity.

Furthermore, the addition of graphene 10 reduced the development of transient gel in the cement slurry 50 after two hours aging. Table 6 below shows the data obtained from each slurry.

TABLE 6

Gel Properties of Type I/II Slurries with and without Graphene

| Cement Type | Graphene (% bwoc) | Time Rheology was Taken | 10 Second Gel | % Change | 10 Minute Gel | % Change |
|---|---|---|---|---|---|---|
| Type I/II (Comparative) | 0.0 | Just Mixed | 13.6 | 44.9 (increase) | 28.3 | 26.3 (increase) |
| Type I/II | 0.7 | Just Mixed | 24.7 | — | 38.4 | — |
| Type I/II (Comparative) | 0.0 | After 2 hours | 41.0 | 10.7 (decrease) | 49.0 | 17.8 (decrease) |
| Type I/II | 0.7 | After 2 hours | 36.6 | — | 40.3 | — |

Additionally, the thixotropic rate, which is a measure of gel strength development over time, was calculated for each of the slurries. The slurry without graphene had a rate of 4.9 after two hours, while the cement slurry 50 of this disclosure comprising graphene 10 showed decrease in rate of 17.8% after two hours (4.0).

Example 3: Class H Cement

Two free fluid tests were performed: the first was of a control slurry of Class H cement and water (15.8 pounds per gallon (ppg)) and the second was of a slurry that contained 0.7% BWOC graphene 10 (available from SurgePower), Class H cement, and water (15.8 ppg). The control slurry was mixed per API specifications. The graphene 10 containing cement slurry 50 was mixed per API specifications, with the exception that the graphene 10 was first pre-blended into the mix water 40 (4000 rpm for 60 seconds). Each slurry was poured into a 250 mL graduated cylinder and placed into a 45 degree free fluid test stand. Both slurries were allowed to rest in the stand for 2 hours at room temperature. After the allotted time, the control slurry was very viscous, as a result of the formation of a strong gel. The control slurry was difficult to remove from the graduated cylinder and a combination of scraping and high pressure water had to be utilized to totally remove it from the graduated cylinder. The graphene 10 containing cement slurry 50 of this disclosure was removed from the test stand and poured into a tri-pour beaker. The graphene 10 containing cement slurry 50 of this disclosure easily flowed out of the graduated cylinder and no further manipulation was required to remove it therefrom. This Example 3 illustrates that graphene does mitigate gel formation in Portland cements.

Additional Disclosure

The following are non-limiting, specific embodiments in accordance with the present disclosure:

In a first embodiment, a cement slurry comprises: graphene, wherein the graphene comprises bioderived renewable graphene (BRG); a cement; and water, wherein the cement slurry, when unset, has reduced transient gel formation relative to a same cement slurry, when unset, absent the graphene.

A second embodiment can include the cement slurry of the first embodiment, wherein the graphene comprises bioderived renewable graphene (BRG).

A third embodiment can include the cement slurry of the second embodiment comprising from about 0.01 to about 20, from about 0.1 to about 15, from about 0.5 to about 5, or greater than or equal to about 0, 0.1, or 0.5 and less than or equal to about 20, 15, or 5 percent BRG by weight of cement (% BRG bwoc).

A fourth embodiment can include the cement slurry of the second or third embodiment, wherein the BRG comprises graphene derived from a plant.

A fifth embodiment can include the cement slurry of the fourth embodiment, wherein the plant comprises cassava.

A sixth embodiment can include the cement slurry of any one of the second to fifth embodiments, wherein the BRG comprises graphene with a fused sheet-like morphology.

A seventh embodiment can include the cement slurry of any one of the first to seventh embodiments, wherein the cement comprises a Portland cement.

An eighth embodiment can include the cement slurry of the seventh embodiment, wherein the cement comprises a Type I, IA, II, IIA, III, IIIA, IV, V, VI, or VII Portland cement, a subtype thereof, or a combination thereof.

A ninth embodiment can include the cement slurry of any one of the first to eighth embodiments, wherein the cement comprises a construction grade cement, wherein a construction grade cement is a cement comprising greater than about 1 weight percent (wt %) calcium aluminate, (C3A).

A tenth embodiment can include the cement slurry of any one of the first to ninth embodiments, wherein the cement comprises an aluminate content in a range of from about 1 to about 30, from about 3 to about 20, from about 5 to about 15, or greater than or equal to about 1, 3, or 5 percent aluminate by mass of cement.

An eleventh embodiment can include the cement slurry of any one of the first to tenth embodiments, wherein a yield point of the cement slurry, when unset, as measured according to API 10B-2 is reduced by at least 10, 20, 30, 40, or 50% relative to the same cement slurry, when unset, absent the graphene.

A twelfth embodiment can include the cement slurry of any one of the first to eleventh embodiments, wherein an apparent viscosity at 100 RPM ($AVIS_{100}$) of the cement slurry, when unset, as measured according to API 10B-2 is reduced by at least 10, 20, 30, 40, or 50% relative to the same cement slurry, when unset, absent the graphene.

A thirteenth embodiment can include the cement slurry of any one of the first to twelfth embodiments, wherein a thixotropic rate of the cement slurry, when unset, measured as the ten minute yield point divided by ten, is less than a thixotropic rate of the same cement slurry, when unset, absent the graphene.

A fourteenth embodiment can include the cement slurry of the thirteenth embodiment, wherein the thixotropic rate of the cement slurry, when unset, is reduced by at least 5, 10, 15, or 20% relative to the thixotropic rate of the same cement slurry, when unset, absent the graphene.

In a fifteenth embodiment, a method of making a cement slurry comprises: combining graphene with water to provide a mix water, wherein the graphene comprises bioderived renewable graphene (BRG); combining the mix water with a cement to provide the cement slurry, wherein the cement slurry has reduced transient gel formation relative to a same cement slurry absent the graphene; and pumping the cement slurry into a workspace.

A sixteenth embodiment can include the method of the fifteenth embodiment, wherein the workspace comprise a wellbore penetrating a subterranean formation.

A seventeenth embodiment can include the method of the sixteenth embodiment, wherein the cement slurry comprises from about 0.01 to about 20, from about 0.1 to about 15, from about 0.5 to about 5, or greater than or equal to about 0, 0.1, or 0.5 and less than or equal to about 20, 15, or 5 percent BRG by weight of cement (% BRG bwoc).

An eighteenth embodiment can include the method of any one of the sixteenth or seventeenth embodiments, wherein the BRG comprises graphene derived from a plant.

A nineteenth embodiment can include the method of the eighteenth embodiment, wherein the plant comprises cassava.

A twentieth embodiment can include the method of any one of the sixteenth to nineteenth embodiments, wherein the BRG comprises graphene with a fused sheet-like morphology.

A twenty first embodiment can include the method of any one of the fifteenth to twentieth embodiments, wherein the cement comprises a Portland cement.

A twenty second embodiment can include the method of the twenty first embodiment, wherein the cement comprises a Type I, IA, II, IIA, III, IIIA, IV, V, VI, or VII Portland cement.

A twenty third embodiment can include the method of any one of the fifteenth to twenty second embodiments, wherein the cement comprises a construction grade cement, wherein a construction grade cement is a cement comprising greater than about 1 weight percent (wt %) calcium aluminate (C3A).

A twenty fourth embodiment can include the method of any one of the fifteenth to twenty third embodiments, wherein the workspace comprises a wellbore penetrating a subterranean formation.

In a twenty fifth embodiment, a method comprises: providing a cement slurry comprising: graphene; a cement; and water, wherein the graphene comprises bioderived renewable graphene (BRG) and wherein the cement slurry has reduced transient gel formation relative to a same cement slurry absent the graphene; placing the cement slurry in a workspace; and allowing the cement slurry to set to provide a hardened cement.

A twenty sixth embodiment can include the method of the twenty fifth embodiment, wherein the workspace comprises an oilwell workspace.

A twenty seventh embodiment can include the method of the twenty fifth or twenty sixth embodiment, wherein the workspace comprises a wellbore penetrating a subterranean formation.

A twenty eighth embodiment can include the method of the twenty fifth or twenty sixth embodiment, wherein the workspace comprises a non-oilwell workspace.

A twenty ninth embodiment can include the method of the twenty eighth embodiment, wherein the cement slurry comprises from about 0.01 to about 20, from about 0.1 to about 15, from about 0.5 to about 5, or greater than or equal to about 0, 0.1, or 0.5 and less than or equal to about 20, 15, or 5 percent BRG by weight of cement (% BRG bwoc).

A thirtieth embodiment can include the method of the twenty eighth or twenty ninth embodiment, wherein the BRG comprises graphene derived from a plant.

A thirty first embodiment can include the method of the thirtieth embodiment, wherein the plant comprises cassava.

A thirty second embodiment can include the method of any one of the twenty eighth to thirty first embodiments, wherein the BRG comprises graphene with a fused sheet-like morphology.

A thirty third embodiment can include the method of any one of the twenty fifth to thirty second embodiments, wherein the cement comprises a Portland cement.

A thirty fourth embodiment can include the method of the thirty third embodiment, wherein the cement comprises a Type I, IA, II, IIA, III, IIIA, IV, V, VI, or VII Portland cement.

A thirty fifth embodiment can include the method of the thirty third or thirty fourth embodiment, wherein the cement comprises a construction grade cement, wherein a construction grade cement is a cement comprising greater than about 1 weight percent (wt %) calcium aluminate (C3A).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of making a cement slurry, the method comprising:
    combining graphene with water to provide a mix water, wherein the graphene comprises bioderived renewable graphene (BRG), wherein the BRG comprises nanosheets comprising greater than 90 weight percent carbon, and wherein the nanosheets have a surface area of at least 2000 m$^2$/g and up to 2496 m$^2$/g, a pore volume of at least 3 cc/g and up to 5.0 cc/g, or a combination thereof;
    combining the mix water with a cement to provide the cement slurry,
    wherein the cement slurry has reduced transient gel formation relative to a same cement slurry absent the graphene; and
    pumping the cement slurry into a workspace, wherein the workspace comprises a wellbore penetrating a subterranean formation.

2. The method of claim 1, wherein the cement slurry comprises from about 0.01 to about 20 percent BRG by weight of cement (% BRG bwoc).

3. The method of claim 1, wherein the BRG comprises graphene derived from a plant.

4. The method of claim 1, wherein the BRG comprises graphene with a fused sheet-like morphology.

5. The method of claim 1, wherein the cement comprises a cement selected from the group consisting of Type I, IA, II, IIA, III, IIIA, IV, V, VI, VII Portland cements, and combinations thereof.

6. The method of claim 1, wherein the cement comprises a construction grade cement, wherein a construction grade cement is a cement comprising greater than about 1 weight percent (wt %) calcium aluminate (C3A).

7. The method of claim 1, wherein a yield point of the cement slurry, when unset, as measured according to API 10B-2 is reduced by at least 10% relative to a same cement slurry, when unset, absent the graphene.

8. The method of claim 1, wherein a thixotropic rate of the cement slurry, when unset, measured as the ten minute yield point divided by ten, is less than a thixotropic rate of a same cement slurry, when unset, absent the graphene.

9. The method of claim 1, wherein an apparent viscosity at 100 RPM (AVIS$_{100}$) of the cement slurry, when unset, as measured according to API 10B-2 is reduced by at least 10% relative to a same cement slurry, when unset, absent the graphene.

10. A method comprising:
    providing a cement slurry comprising: graphene; a cement; and water, wherein the graphene comprises bioderived renewable graphene (BRG), wherein the BRG comprises nanosheets comprising greater than 90 weight percent carbon, and wherein the nanosheets have a surface area of at least 2000 m$^2$/g and up to 2496 m$^2$/g, a pore volume of at least 3 cc/g and up to 5.0 cc/g, or a combination thereof, and wherein the cement slurry has reduced transient gel formation relative to a same cement slurry absent the graphene;
    placing the cement slurry in a workspace, wherein the workspace comprises a wellbore penetrating a subterranean formation; and
    allowing the cement slurry to set to provide a hardened cement.

11. A method of making a cement slurry, the method comprising:
    combining graphene with water to provide a mix water, wherein the graphene comprises bioderived renewable graphene (BRG), wherein the BRG is produced by:
    combining a renewable carbohydrate material with a dehydration solvent to aid hydrolysis;
    removing glycosidic linkages and water via chemical and/or thermal activation to provide an intermediate fused carbon material;
    thermochemically activating the intermediate fused carbon material to exfoliate intercalated carbon layers of the intermediate fused carbon material and to initiate chemical bonding of carbon atoms to form the BRG, wherein the BRG comprises a network of high surface area and pore volume sp2 bonded carbon nanosheets, wherein the nanosheets have a surface area of at least 2000 m$^2$/g and up to 2496 m$^2$/g, a pore volume of at least 3 cc/g and up to 5.0 cc/g, or a combination thereof;

combining the mix water with a cement to provide the cement slurry,
wherein the cement slurry has reduced transient gel formation relative to a same cement slurry absent the graphene; and
pumping the cement slurry into a workspace, wherein the workspace comprises a wellbore penetrating a subterranean formation.

12. The method of claim 11, wherein the dehydration solvent comprises water, ethylene glycol, ethanol, or a combination thereof.

13. The method of claim 11, wherein the chemical activation comprises activation with sodium hydroxide, hydrochloric acid, phosphoric acid, phosphorous acid, nitric acid, or a combination thereof.

14. The method of claim 11, wherein removing glycosidic linkages is effected in the presence of a catalyst selected from yeast, aluminum-nickel alloy, cobalt, $B_2H_6$, zinc, copper, or a combination thereof.

15. The method of claim 11, wherein removing glycosidic linkages comprises exposing a mixture of the carbonaceous material, a chemical, and optionally a catalyst to a temperature in a range of from about 45° C. to about 1050° C., in air or inert atmosphere to aid formation of the intermediate fused carbon material, wherein the intermediate fused carbon material comprises a fused carbon network with a sheet-like morphology.

16. The method of claim 11, wherein the thermochemically activating comprising heating to a temperature in a range of from about 500 to about 1500° C., in an inert gas containing hydrogen gas.

17. The method of claim 16, wherein the thermochemically activating further comprises treating the intermediate fused carbon product with a chemical selected from hydrazine, $LiAlH_4$, $B_2H_6$, and/or $NaBH_4$, or a combination thereof.

18. The method of claim 11, wherein thermochemically activating comprises direct heating of the intermediate fused carbon material to exfoliate and remove water from the intermediate fused carbon material to form the BRG.

* * * * *